United States Patent [19]

Iwasawa et al.

[11] Patent Number: 5,361,352
[45] Date of Patent: Nov. 1, 1994

[54] METHOD FOR DEBUGGING IN A PARALLEL COMPUTER SYSTEM AND SYSTEM FOR THE SAME

[75] Inventors: Kyoko Iwasawa, Tokyo; Yoshikazu Tanaka, Omiya, both of Japan

[73] Assignee: Hitachi, Ltd., Tokyo, Japan

[21] Appl. No.: 617,782

[22] Filed: Nov. 26, 1990

[30] Foreign Application Priority Data

Nov. 27, 1989 [JP] Japan .................. 1-304608

[51] Int. Cl.⁵ ............................................. G06F 11/00
[52] U.S. Cl. ................................... 395/700; 395/650;
364/DIG. 1; 364/267.91; 364/267; 364/281.3;
364/281.7
[58] Field of Search .................... 395/700; 371/19;
364/200, 300

[56] References Cited

U.S. PATENT DOCUMENTS

| | | | |
|---|---|---|---|
| 4,394,725 | 4/1983 | Bienvenu et al. | 364/200 |
| 4,589,068 | 3/1986 | Heinen, Jr. | 364/300 |
| 5,048,018 | 11/1991 | Bernstein et al. | 371/19 |
| 5,287,465 | 3/1994 | Kurasawa et al. | 275/375 |

OTHER PUBLICATIONS

Cheung, Wing-Hongi et al.; "A Framework for Distributed Debugging"; IEEE Software; 1990 Jan.

*Primary Examiner*—Gareth D. Shaw
*Assistant Examiner*—Jonathan Backenstose
*Attorney, Agent, or Firm*—Fay, Sharpe, Beall, Fagan, Minnich & McKee

[57] ABSTRACT

In a parallel computer, a method for controlling a debugging process includes the steps of registering identifiers of plural processors into an execution waiting queue in a predetermined order; executing a corresponding program by each of the processors in an order until it is brought into either a waiting state or an end state; registering the identifier of the processor of the waiting state as a last element of the execution waiting queue; and repeating the executing step until there are no executable processors. A program having a bug is determined from the identifiers left in the execution waiting queue. Further, the debugging-process control method further includes outputting trace data during execution of the executing step, the program having the bug is determined from this trace data.

16 Claims, 9 Drawing Sheets

| PROCESSOR No. | 0 | 1 | 2 | ... | N-1 | N |
|---|---|---|---|---|---|---|
| REFERENCE | A(-1) A(1) | A(0) A(2) | A(1) A(3) | ... | A(N-2) A(N) | A(N-1) A(N+1) |
| DEFINITION | | A(1) | A(2) | ... | A(N-1) | A(N) |

→ EXECUTION ORDER

FIG. 7B

| PROCESSOR No. | N | N-1 | ... | 2 | 1 | 0 | N | N-1 | ... | 2 | 1 | 0 |
|---|---|---|---|---|---|---|---|---|---|---|---|---|
| REFERENCE | A(N-1) A(N+1) | A(N-2) A(N) | ... | A(1) A(3) | A(0) A(2) | A(-1) A(1) | | | | | | |
| DEFINITION | | | ... | | | | A(N) | A(N-1) | ... | A(2) | A(1) | |

→ EXECUTION ORDER

FIRST CYCLE | SECOND CYCLE

METHOD FOR DEBUGGING IN A PARALLEL COMPUTER SYSTEM AND SYSTEM FOR THE SAME

BACKGROUND OF THE INVENTION

1. Field of the Invention

The present invention generally relates to a parallel computer system. More specifically, the present invention relates to a debug method for eliminating bugs peculiar to a parallel processing operation from a user program for each processor element, and to a system for the same.

2. Description of the Related Art

To improve calculation speed, various parallel computer systems for simultaneously operating plural processor elements have been developed. In such conventional systems, there are two types of parallel computer systems. In one type of parallel computer system, all processor elements are connected to a shared memory via which data is transferred. In the other type of parallel computer system, each processor element has a local memory unit and directly transfers data to other processor elements via a network. In the former, synchronization control is performed for controlling an order accessing to the shared memory upon transmission and reception of the data, and in the latter, data transmission and reception control is performed for controlling an order of transmission of data by another processor element and reception of the data by the processor element.

The conventional computer languages such as a FORTRAN language, or specific computer languages are prepared as user interfaces in the parallel computer systems. Bugs peculiar to the parallel processing operation may be introduced into a program when the program is coded by utilizing such a computer language. These bugs, peculiar to the parallel processing operation, are usually faults of the synchronization control, e.g., lack of a control statement that the plurality of processor elements simultaneously define or use the same address of a shared memory and faults of the data transmission and reception control or errors of an algorism introduced into a program when the program is rewritten for a distributed memory system. In particular, when a parallel processing operation is performed without the synchronization control, an execution order of respective processing sub-operations is not insured so that the execution order is different every time the parallel processing operation is carried out, and hence the reproducibility cannot be insured.

Although there is no definitely complete debugging method for such parallel computer systems, several debugging methods have been so far proposed in order to eliminate these bugs from the programs. One product named as "Pdbx Parallel Debugger" is commercially available from SEQUENT COMPUTER SYSTEMS INC. The debugging method of this debugger is described in a leaflet "Pdbx Parallel Debugger for Balance Computer Systems" thereof. In this product, there is a means for causing an operator to recognize a situation of the parallel processing operation by outputting trace data on the synchronization control of "post/wait" during a performance of the parallel processing operation. In addition, the product has a function for interrupting the parallel processing operation on the way. In order to debug programs including faults of synchronization control as bugs in a stable and reproducible state, the bugs are desirably detected from trace data produced by sequential execution of the programs, not parallel execution. A method for sequentially performing the debug processing is disclosed in the reference JP-1-106234. However, in the reference, the debug processing is performed once in parallel to output trace data and the order of the debug processing to be then sequentially performed is determined by use of the trace data. Thus, in this conventional method, the debug processing must be performed in parallel before this processing is sequentially performed.

In general, since execution statements on the data transmission and reception or the synchronization control are described in subprograms of a user program for a parallel computer system, when these subprograms are sequentially executed, the parallel computer system is brought into a data waiting state in which a processor element in the system is left waiting for data that is not being transmitted so that the processor element cannot proceed an operation. As a result, there is a problem in that the execution of the user program cannot be proceeded regardless of the user program having no bug.

SUMMARY OF THE INVENTION

The present invention solves the above-described problems, and therefore has an object to provide a method and system for sequentially executing programs which are written for respective processor elements in a simpler way.

Another object of the present invention is to provide a method and system for sequentially executing such programs without the processor elements being brought into data waiting states because of normal data transmission/reception control and synchronization control.

Further another object of the present invention is to provide a debug processing control method and a system for such a debug processing control, in which debug processing can be performed without modifying a main program of a user program by preparing a normal execution library and a debug processing library.

To achieve the above-described objects, in the present invention, parallel processing programs are sequentially executed in accordance with the following method.

In a parallel computer system having a plurality of processors, a method for sequentially executing a plurality of programs to be executed in parallel by the computer system, each program to be executed by one of the processors, includes the steps of:

(a) initially registering identifiers for said plurality of processors into a queue in a predetermined order;

(b) taking out the first one of the identifiers currently registered in said queue, the currently registered identifiers being initially equal to the identifiers of the processors;

(c) causing a processor identified by the taken out identifier to execute a corresponding program;

(d) stopping execution of the corresponding program by said processor when said processor has fallen into a waiting state for either data to be supplied from another processor or synchronization with another processor;

(e) additionally registering the taken out identifier in said queue; and (f) repeating said steps (b) to (e) for each of identifiers currently registered in said queue, and wherein repetition of the step (c) with respect to a particular processor for an identifier which has been additionally registered in said queue by preceding execution by said step (e), includes the step of causing the particular processor to execute a non-executed portion of corresponding program which has been left waiting for data or synchronization.

DESCRIPTION OF THE PREFERRED EMBODIMENTS

A debug-processing control system according to a preferred embodiment of the present invention will now be described, taking as an example, a distributed parallel computer system having local memory units, with reference to accompanying drawings.

Figure 2:
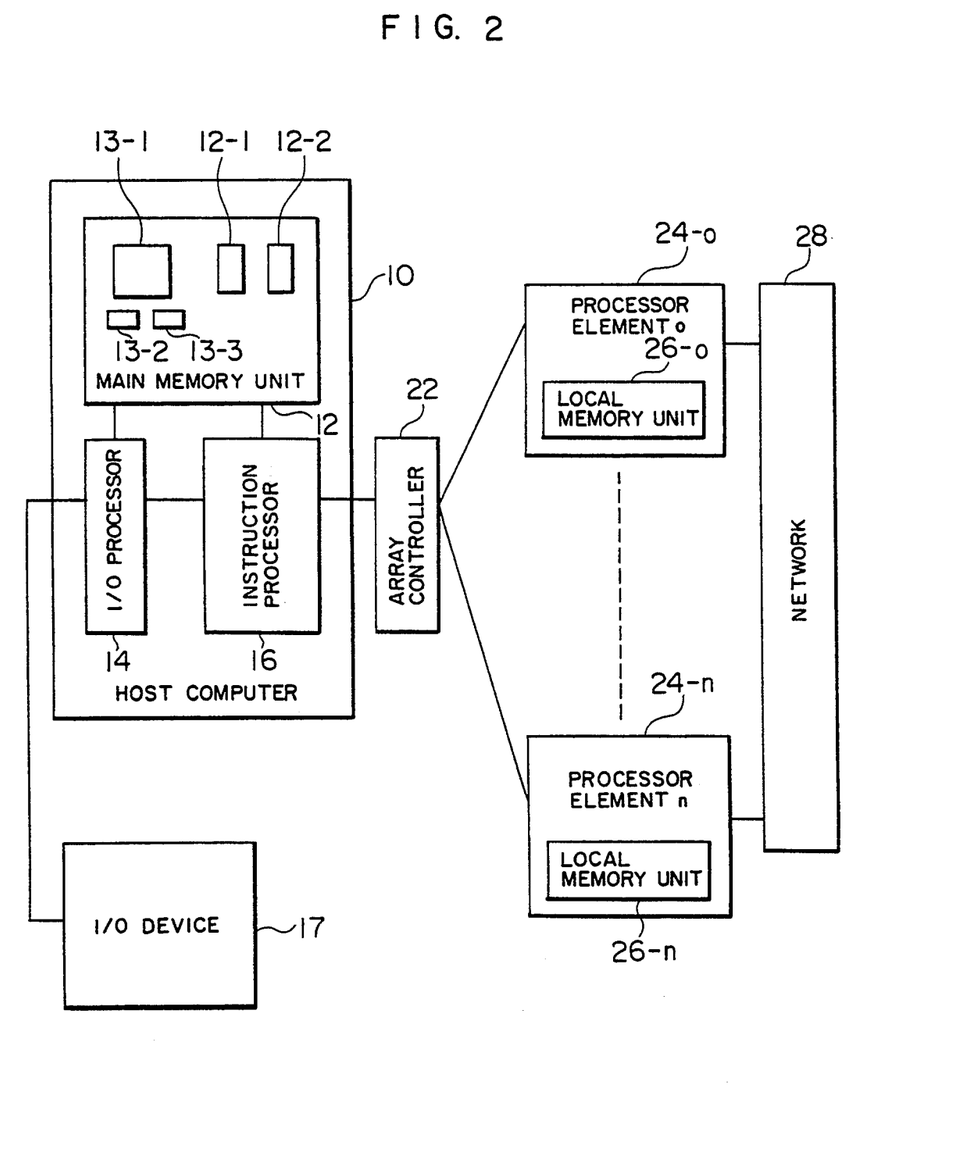
FIG. 2 is a schematic block diagram showing an arrangement of a parallel computer system to which the present invention is applied.

In FIG. 2, there is shown an arrangement of a parallel computer system to which the debug-processing control system is applied. A host computer 10 includes a main memory unit 12, an I/O processor 14 and an instruction processor 16. In the main memory unit 10, there are stored an execution processor queue 12-1, an end determination queue 12-2, a main program 13-1, and two libraries 13-2, 13-3 for normal processing and debug processing. An I/O device 17 is connected to the I/O processor 14. An array controller 22 is connected to the instruction processor 16. The host computer 10 controls (n+1) processor elements 24-0 to 24-n via the array controller 22. Each of the processor elements has a local memory unit and is assigned with a processor number. The respective processor elements perform data transmission and reception via a network 28. Although each of these processor elements cannot access local memory units 26-0 to 26-n of other processor elements, the respective processor elements can freely access the main memory unit 21 in the host computer 10 via the array controller 22 which connects the host computer 10 to the processor elements 24-0 to 24-n.

An epitome of an operation of the embodiment will be explained first. A debug processing control routine called in a user program for the host computer performs the following processes:

(1) As an initialization step, all of the startable processor elements are registered into either an execution processor table or queue which is referred to by the host computer.

(2) An arbitrary processor element among the startable processor elements is started. A corresponding subprogram is executed until the started processor element is brought into a "waiting state for data or for synchronization" or a "processing end state". Both this state and a restart address are supplied to the host computer and the execution of this subprogram is stopped.

(3) While the processing of the step (2) is repeated until there is no executable processor in the table or queue, and thus the processor elements which would be simultaneously executed are now operated one by one.

(4) Initial setting of the table or queue is changed so as to change a sequential execution order for the processor elements to be started in parallel.

All of the processor elements may be set to the startable state based on the debug processing control routine executed by the host computer in the step (1).

Practically, the processor elements can be operated one by one in the steps (2) and (3). When the processor element is set to the "waiting state", it is stopped to inform the host computer of the state and the restart address. When receiving the information, the host computer starts an other processor element. As previously described, the subprograms, each of which contains data transmission/reception control necessary for access to a distributed memory or synchronization control necessary for access to a shared memory and is provided for each processor element, can be executed by the respective processor elements, while maintaining the order designated by the data transmission/reception control or synchronization control. Further, the processor element which has supplied the restart address to the host computer 10 in the "waiting state" is registered in the table or queue and can be started when another processor element is started to enable the processor element to receive data.

The execution order of the subprograms which should be originally executed in parallel can be changed in the process (4) within a range subject to the data transmission/reception control or synchronization control described in the user program. As a result, the various execution orders which may happen to occur during the parallel operation, can be realized under such a condition that only a single processor element is operated. Therefore a technique similar to the conventional debug processing is effected for a single processor element, e.g., a technique in which the debug processing is temporarily stopped or data is outputted from the processor element, can be utilized.

Based upon these functions, it is possible to detect faults of the synchronization control (lack of a send or receive command or incorrect correspondence relation of the send and receive commands) and/or errors of calculations caused when the subprograms are executed in parallel, from trace data under the various execution orders. Accordingly, bugs contained in the user program which cause abnormal completion or the incorrect results of the parallel processing operation can be easily removed.

Figure 3:
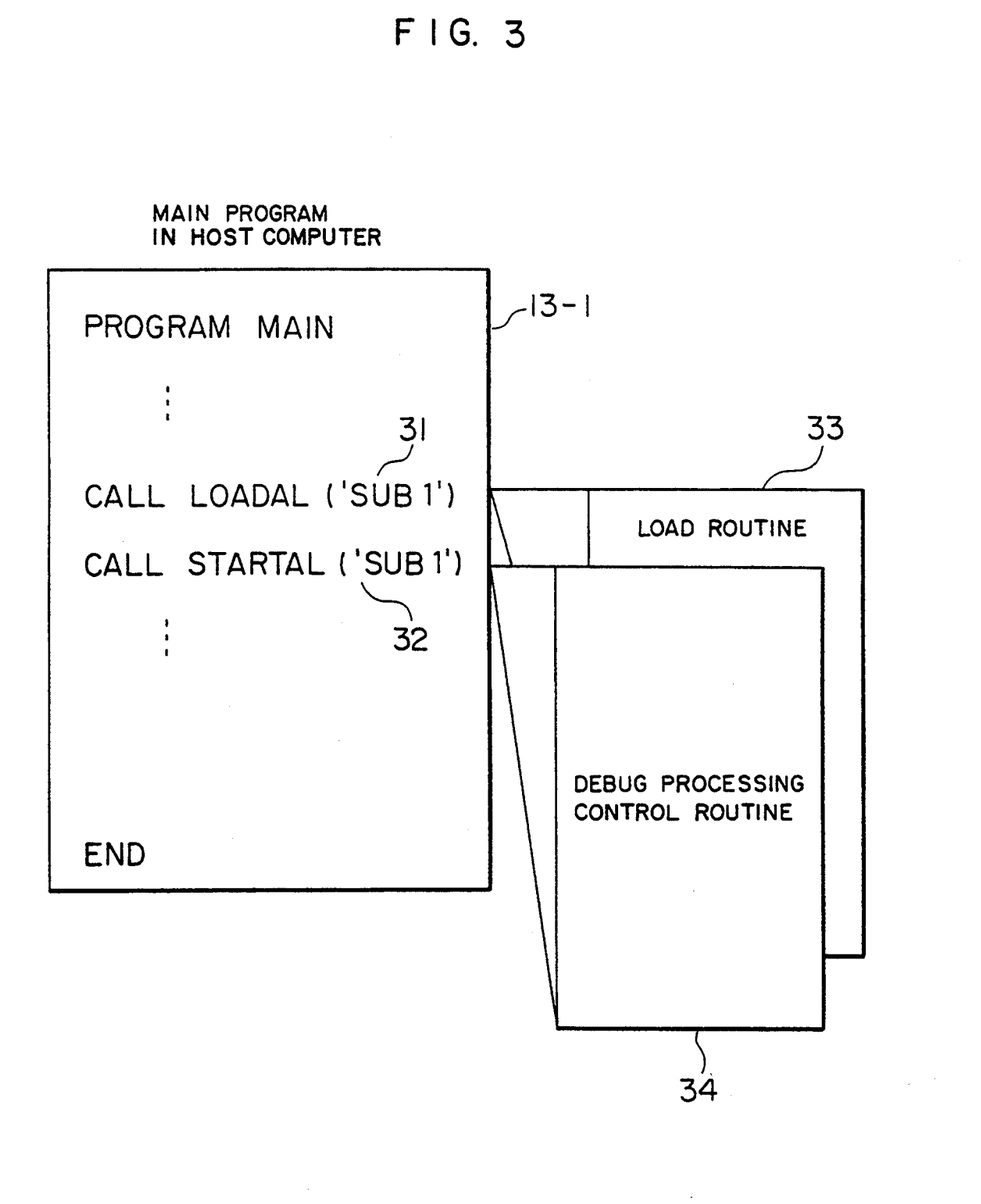
FIG. 3 illustrates a user program in a host computer.

FIG. 3 represents one example of the main program of the user program executed by a parallel computer system. When the main program 13-1 is executed by the host computer, a load routine 33 for loading a subprogram from the main memory unit 12 to each of the processor elements is called in accordance with a load module name, "SUB 1", as the parameter by way of a statement 31 within the main program 13-1. Subsequently, a debug processing control routine for starting each processor element is called in accordance with an entrance name, "SUB 1", of the subprogram for each processor element as a parameter.

Figure 8:
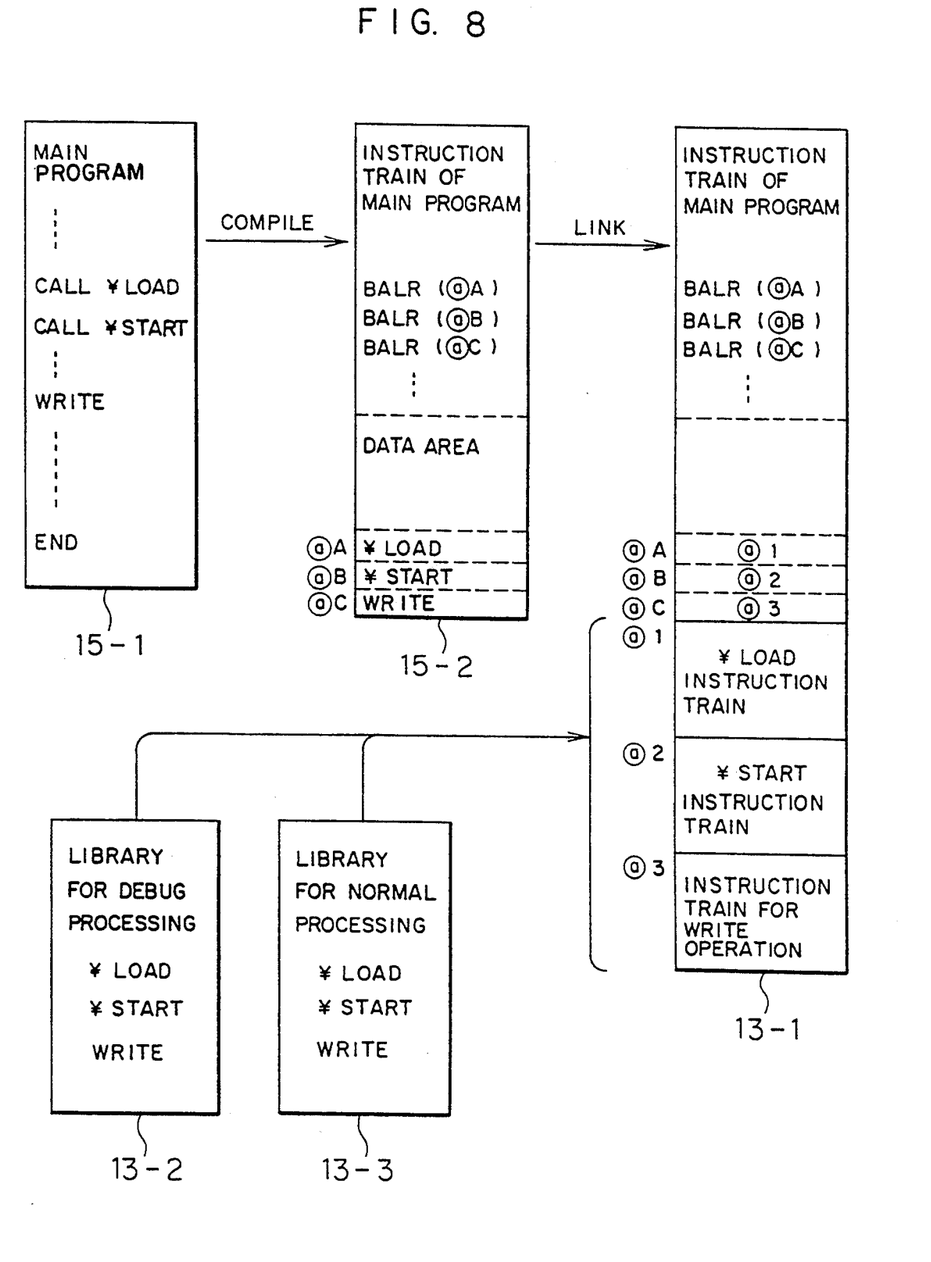
FIG. 8 is an illustration for explaining operations when a main program of the user program is compiled and linked; and, FIG. 9 is a schematic block diagram showing an arrangement of a parallel computer system using a table instead of the queue according to another preferred embodiment of the present invention.

As represented in FIG. 8, according to the present invention, there are provided with a library 13-3 including such a normal processing control routine as when all the processor elements are concurrently started during a normal processing operation, and a library 13-2 including a debug processing control routine for sequentially starting each of the processor elements during a debug processing operation. The two libraries 13-2 and 13-3 are identical to each other except for both the control routines. The same entrance names have been given to both the control routines. After the main source program 15-1 is compiled, either the library 13-2 or 13-3 is linked to the compiled main program 15-2 in accordance with an aim of the processing operation. As a consequence, there is no necessity that the library 13-2 is linked to the main program after the main source program 15-1 has been modified and compiled for the debug processing operation.

In addition, there is no necessity that the main source program 15-1 is again returned to the original, compiled, and linked with the library 13-3, after the debug processing operation has been accomplished. A user can select one library depending upon a processing aim, and link the selected library to the compiled main program. As a result, the debug processing operation and the like can be easily executed in a short time.

Figure 1:
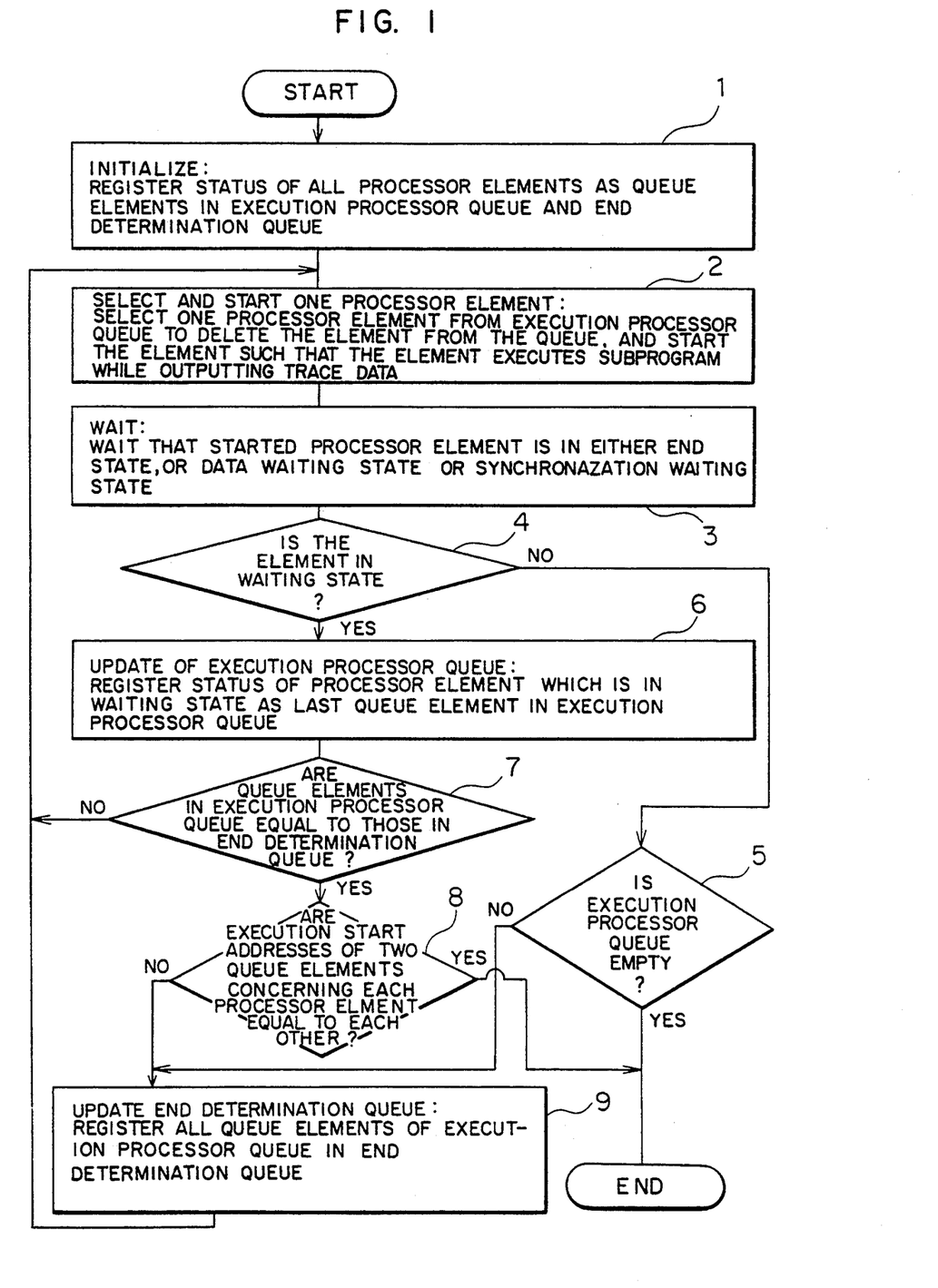
FIG. 1 is a flowchart for explaining a debug-processing control method according to a preferred embodiment of the present invention.
Figure 4:
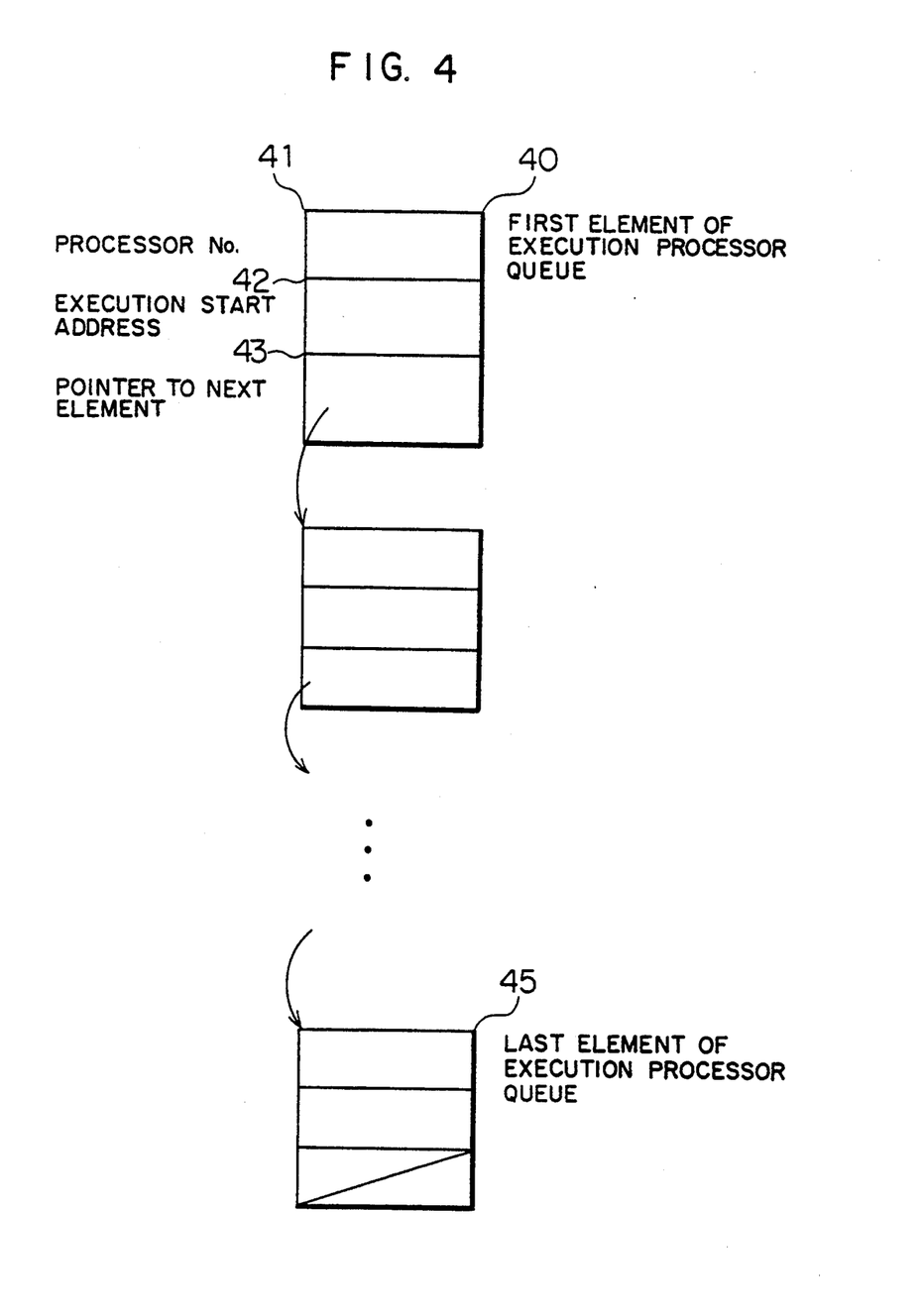
FIG. 4 is a schematic block diagram for an arrangement of execution processor queue.

FIG. 1 briefly represents an overall processing operation of a debug processing control routine 34. An arrangement of an execution processor queue 12-1 employed in this control routine is represented in FIG. 4. Each element of the execution processor queue 12-1 contains a processor number 41 indicative of the number of a processor element to be started, an execution start address 42 in a subprogram to be executed by this processor element, and a pointer 43 for representing a next queue element.

Figure 5:
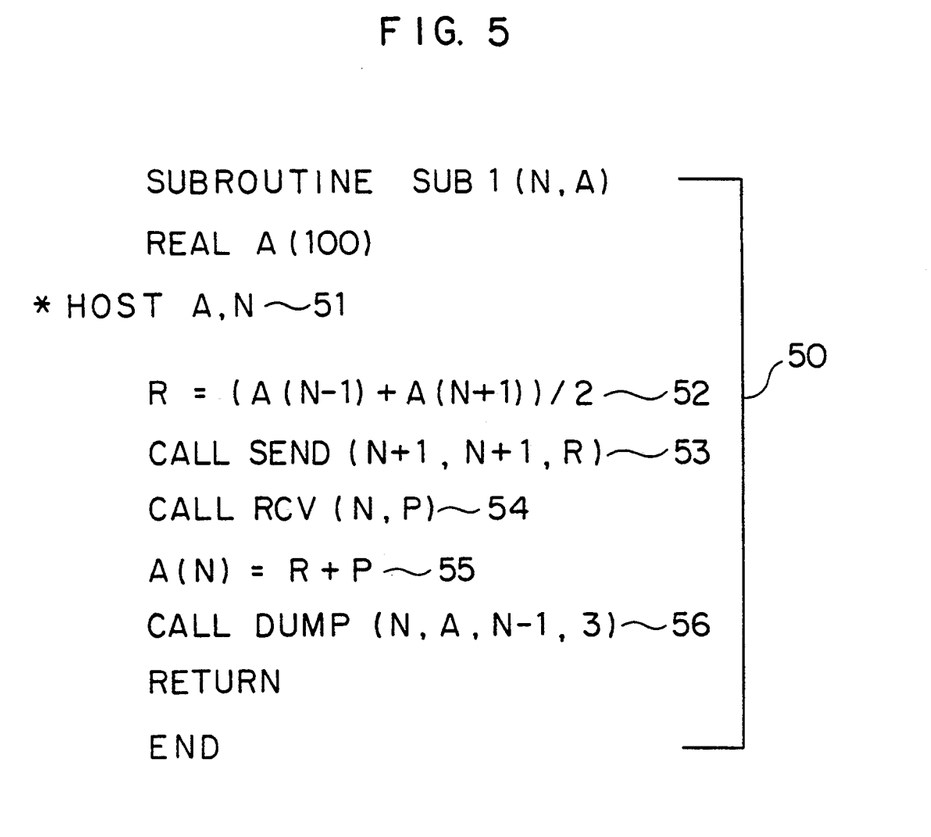
FIG. 5 represents a subprogram loaded to each of processor elements.

The debug processing control routine 34 shown in FIG. 1 will now be described, referring to such an example that the subprogram shown in FIG. 5 is executed by the respective processor elements.

While the main program of FIG. 3 is executed, the load routine 33 is executed in the statement 31, and each of the subprograms is loaded to a corresponding local memory unit 26-i ("i" being zero to n) from the main memory unit.

A statement 53 calls a transmission processing routine for transmitting data. In this statement 53, a first parameter "N+1" indicates a processor number of a processor element to which the data is transmitted, a second parameter "N+1" an identifier for identifying the data, and a third parameter "R" the data. A statement 54 calls a reception processing routine for receiving data. In the statement 54, a first parameter "N" indicates an identifier for identifying the data, and a second parameter "R" indicates the data. When this reception processing routine is called, the processor element performs nothing and is brought into a data waiting state for the data "P" when the data "P" has not yet arrived. In the shared memory computer system, the processor element is brought into a waiting state for synchronization. A statement 56 calls a dump routine for outputting a calculation result. A first parameter "N" in this statement 56 indicates a processor number, a second parameter "A" an output array, and third and fourth parameters "N−1" and "3" elements of the output array and the number of elements respectively.

Figure 6A:
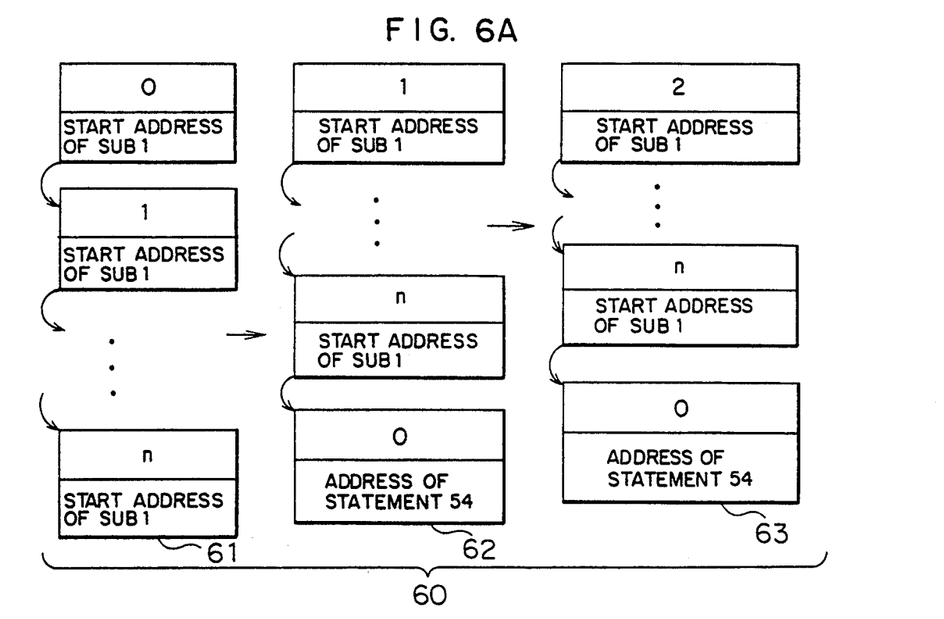
FIGS. 6A and 6B are illustrations of states of the execution processor queues when the user program shown in FIG. 3 is executed.
Figure 6B:
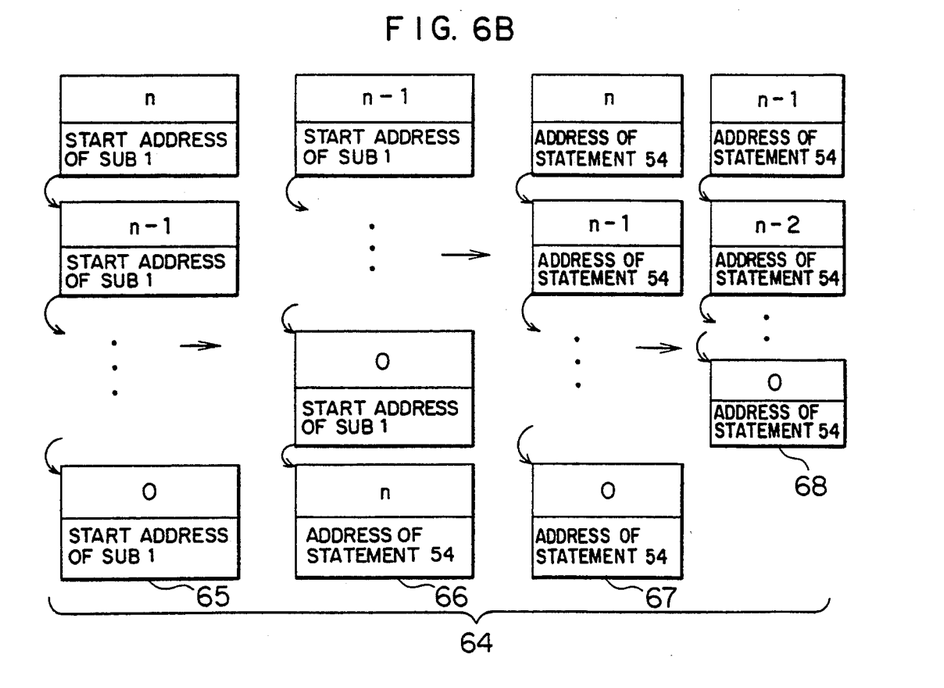

It can be understood from a declaration 51 that virtual parameters "A" and "N" of the subroutine 50 shown in FIG. 5 are present in the main memory unit of the host computer. "N" represents the number of the processor. A case wherein priorities are assigned to the processor elements in order from the smallest or largest processor number such that this subprogram is executed by each processor element will now be described with reference to FIGS. 6A and 6B.

A statement 32 in the main program 13-1 is executed and then the debug processing control routine 34 is called.

In the debug processing control routine 34, the host computer 10 registers statuses of all the processor elements into the execution processor queue 12-1 at a step 1 in such a manner that an entry address of the subprogram 50 is an execution start address. In case of the incrementing order of the processor numbers, the content of the execution processor queue is represented as 61 of FIG. 6A. In case of the decrementing order of the processor numbers, the content of the execution processor queue are shown as 65 of FIG. 6B. In the end determination queue 12-2, the content of the execution processor queue 12-1 at a proper time, for example, a starting time is registered in order to detect the deadlock state of each processor element during the data transmission and reception. The queue 12-2 is employed to determine whether each element which is not yet brought into an "end state" is in the deadlock state waiting for data or synchronization, or a normal execution state. As a result, the end determination queue 12-2 also has a form, as shown in FIG. 4, similar to that of the execution processor queue 12-1.

At a step 2, an arbitrary one of processor elements registered in the queue 12-1 is selected to delete a queue element corresponding thereto from the queue 12-1, and then this processor element is started. In case of the incrementing order of the processor numbers, the processor element having the processor number "0" is selected. When the selected processor element is started, it is brought into a data waiting state in the statement 54. On the other hand, in case of the decrementing order of the processor numbers, the processor element having the processor number "N" is first selected and then started. A queue element corresponding to the processor number "N" is deleted from the queue 12-1. The execution order for the respective processor elements can be changed by the initialization at the step 1 and the selection at the step 2. The elements of the queue 12-1 may be simply arranged in the incrementing or decrementing order of the processor numbers as performed in the above-described example, otherwise may be arranged at random, or a specific processor may be positioned at a head.

The started processor element executes a corresponding subprogram until it is brought into the waiting state or end state while outputting data concerning transmission/reception data and data of variables and arrays in the corresponding local memory unit as trace data necessary for analysis of the executing state thereof.

Once the selected processor element is started, the debug processing control waits at a step 3 for a restart address to be returned this processor element and brought into an "end" or "data waiting" state. If the "end" status is returned, the control advances to a step 5 via the step 4. At the step 5, if the queue 12-1 is empty, the debug processing is completed. If the processor element is yet registered in the queue 12-1, the queue 12-2 is updated and then the control is returned to the step 2.

On the other hand, when the "data waiting" status is returned, the control advances to a step 6 via the step 4. At the step 6, the processor number of this processor element is registered together with the restart address as the start address into the last of the queue 12-1. Accordingly, in case of the incrementing order, an address of the statement 54 is registered into the last of the queue 12-1, and the content of the queue 12-1 is shown as 62 of FIG. 6A. To the contrary, in case of the decrementing order, the processor element N executes a corresponding subprogram or process and waits for data in the statement 54, at this time, the content of the queue 12-1 becomes 66 of FIG. 6B at the step 6. Subsequently, a step 7 is performed.

An end determination of the debug processing is performed at a step 7 and a subsequent step 8. When the processor elements registered in the queue 12-1 are equal to those registered in the queue 12-2, and also the start addresses of both queues are equal to each other for every processor element, it indicates that each processor element registered in the queue 12-1 is brought into the "data waiting" state, i.e., the deadlock state in which the processor element cannot continuously execute the corresponding subprogram. In this case, data for representing that these processor elements are in the deadlock states are outputted to the I/O device 17. When the content of the queue 12-1 is not equal to that of the queue 12-2, since execution possibilities of all processor elements are not denied, the control returns to the step 2 via the step 9 to start the subsequent processor element. The step 9 is performed when any start address is different, or the queue 12-1 is determined to be not empty at the step 5. At the step 9, the content of the queue 12-1 is registered into the queue 12-2.

In the example of the incrementing order, the queue 12-2 is updated to the state of 62 and the control returns to the previous step 2 to start the processor element 1. When the processor element 1 is started since the processor 0 has already transmitted in the statement 53 data to be received by the processor element, the processor element 1 does not wait for the data at the statement 54 and executes the subprogram until the last, whereby the process of the subprogram is ended. As a consequence, the processor element 1 is not registered in the queue 12-1, the content of the queue 12-1 becomes a state 63 of FIG. 6A. Thus, when the debug processing proceeds, the debug processing is accomplished while the processor element "0" is left at the queue 12-1.

In case of the decrementing order, a processor element $N-1$ is started at the step 2 after the processing by the processor element N is ended. At this time, the trace data as described above is also outputted to enable the operator to know the parallel execution state. In this case, since no data to be received in the statement 54 has yet been transmitted, all of the processor elements are operated for one cycle and the content of the queue 12-1 becomes such a state 67 of FIG. 6B. At a second cycle, when the processor element N is started from the statement 54, since the reception data has been transmitted at the statement 53 by the processor element $N-1$ in the first cycle, the processor element N executes the subprogram until the last step. Accordingly, the content of the queue 12-1 becomes a state 68 of FIG. 6B. As previously stated, the reception data are successively received by the processor elements at the second cycle, and only the processor element 0 remains at the queue 12-1 at last.

Even when the debug processing is performed in the incrementing order of the processor number, or in the decrementing order thereof, it can be seen that the queue 12-1 is not brought into the empty state and the processor element 0 remains in the waiting state when the debug processing is completed. This definitely implies that there are bugs in the source program. It can be understood that the bugs must be removed by any method such as transmitting the data by another processor element or not receiving the data by the processor element 0.

Figure 7A:
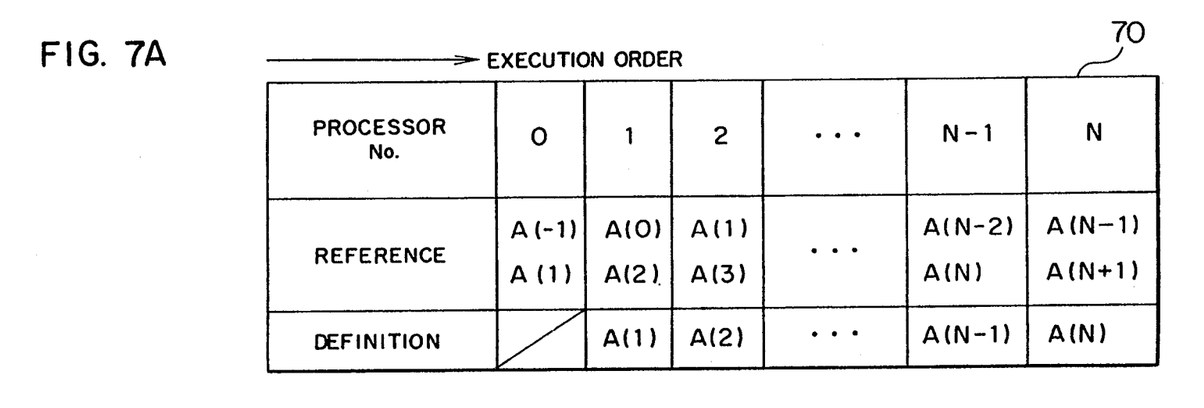
FIGS. 7A and 7B represents both execution orders and accessing results to a main memory when the user program of FIG. 3 is executed.
Figure 7B:
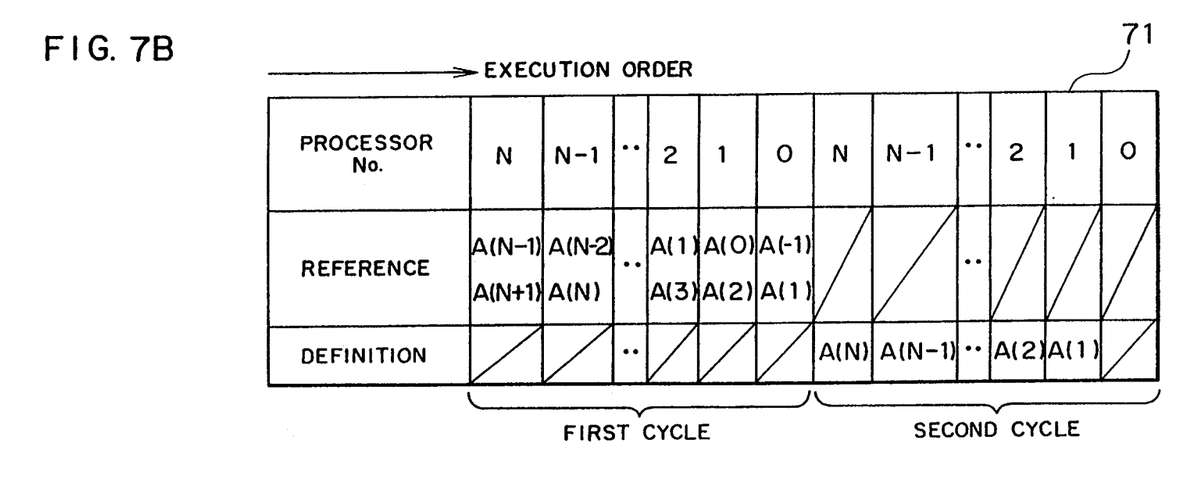

In addition, if the trace data concerning the array "A" which is present in the main memory unit 12 of the host computer 10, defined by the respective processor elements, and further referred to thereby is outputted when the statement 56 is executed, the content of the trace data becomes as shown in 70 of FIG. 7A in case of the incrementing order of the processor number, whereas as shown in 71 of FIG. 7B in case of the decrementing order thereof.

In case of the incrementing order of the processor number as represented in 70 of FIG. 7A, for instance, the values of the array "A(1)" referred to by the processor element 2 has been defined by the processor element 1. Thus, the values which have been defined by the immediately before operated processor element are used. However, if the debug processing is performed in the decrementing order of the processor number, as represented in 71 of FIG. 7B, each of the processor elements refers to the array "A" just before the corresponding subprogram "SUB1" is executed. After all of the processor elements have finished referring to the array "A", each of these processor elements defines the values of the array "A". As a result, even when the sequences of the data transmission and reception are kept, the calculation results obtained in the incrementing order of the processor number are different from those in the decrementing order thereof. It can be recognized that the reason why the calculation results are different from each other every time each of the processor elements is operated in a parallel form, is that the sequence defining and referring to the array "A" in the main memory unit is indefinite. As a consequence, it can be detected that the source program must be corrected by inserting the synchronization control for fixing the definition and referring sequence of the array "A".

The above embodiment is described in association with the parallel computer system including a plurality of processor elements each of which has the local memory unit. However, the present invention can be apparently applied to a parallel computer system including a plurality of processor elements which are connected to each other via a shared memory. In this case, bugs including a bug of the synchronization control in place of a bug of data transmission/reception control can be detected, as in the above embodiment.

According to the present invention, a plurality of processor elements can be operated one by one in the various orders where the sequences are limited by the data transmission/reception control or the synchronization control, by simply linking the debug-processing control routine to the compiled source program without recompiling the source program. In addition a subprogram containing the data transmission/reception control or the synchronization control and provided for each of the plurality of processor elements which can operate in parallel can be checked whether or not bugs in the subprogram. Accordingly, when the trace data in the various execution orders are picked up to be analyzed, detection can be made of causes of the deadlock state or the debugs such as lack of the data transmission/reception control or synchronization control in which the calculation results are different from each other, depending upon the execution order.

It should be noted, as described above, that various methods each for registering the processor elements in the execution process queue can be conceived. In principle, users can arbitrarily determine such a method. However, the following algorithm may be proposed, adapted for an object of the debug processing and a program to be debug processed. In case that the process execution order is performed at random, there is one proposed method of determining the execution order by generating random numbers with respect to the execution starting time. On the other hand, if the debug-processing time must be shortened, it is desirable to determine the execution order in such a way that the processes containing many data transmission steps are executed with priority.

Although the end determination queue is used in the preferred embodiments, this queue may not be necessarily used. That is to say, it may be detected that the corresponding subprograms are executed and completed by the respective processor elements. For instance, the processor number of the processor element which has completed the execution of the corresponding subprogram may be merely stored. In this case, when processor elements are remained in the execution processor queue as in the above-described example, each of these processor elements is restarted, and when the content of the execution processor queue after operation of each element is the same as that before the operation of each element, it may be determined that the debug processing has been completed.

Figure 9:
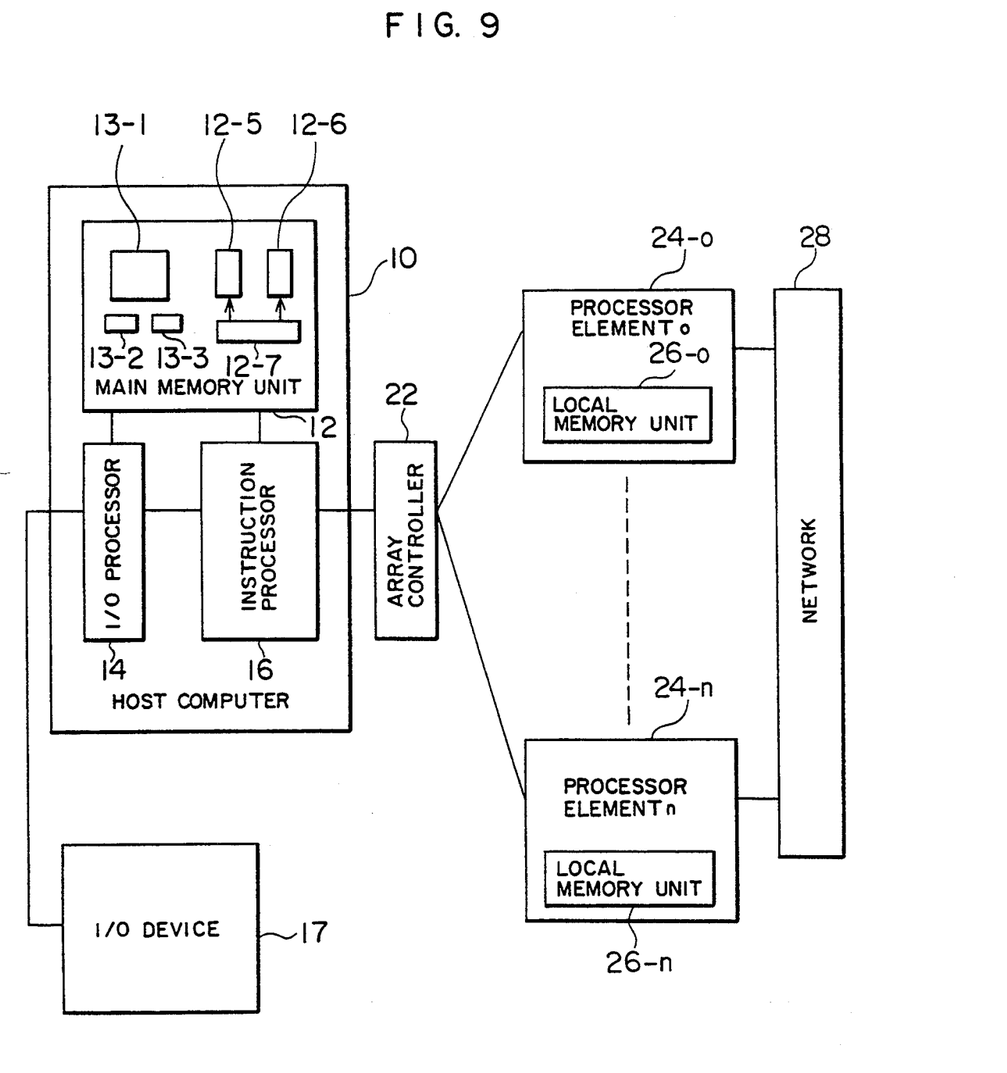

Moreover, although the execution processor queue has been employed in the preferred embodiments, it is obvious that a table may be merely used. In such a case, as represented in FIG. 9, an execution processor table 12-5, an end determination table 12-6, and an address generator 12-7 are prepared in a main memory unit 12. Each of elements in the table 12-5 corresponds to one processor element, and stores both a flag for indicating whether or not the corresponding processor element is in the execution waiting state, and a restart address. The address generator 12-7 generates addresses in such a manner that the elements of the table 12-5 are designated as described above, and both the flag and the restart address may be updated based on this execution result.

What is claimed is:

1. In a parallel computer system including a main processor and a plurality of processors each having an identifier, a method for sequentially executing parallel programs for identification of bugs comprising the steps of:
   (a) registering, by the main processor, data sets for said plurality of processors into a queue in a predetermined order, each data set including an identifier of one of the processors and an execution address of one of the programs corresponding to the processor;
   (b) removing, by the main processor, one of the data sets registered in said queue;
   (c) controlling, by the main processor, said processor identified by the identifier included in the removed data set to execute the corresponding one program until said processor has fallen into either an end state or a waiting state for either data to be supplied from another processor or synchronization with another processor, while inhibiting operation of the other processors;
   (d) registering in said queue by the main processor, a data set including the identifier of the executing processor and an address from which the execution is restarted when the executing processor has fallen into the waiting state; and
   (e) repeating said steps (b) to (d) until a predetermined end condition is satisfied.

2. The method according to claim 1, wherein said step (e) includes the steps of: determining that the end condition is satisfied, when the data sets registered in said queue are the same before and after a repetition of said steps (b) to (d);
   executing said steps (b) to (d) again; and
   stopping further repetition of said step (b) to (d) when said data sets are determined to be same.

3. The method according to claim 2, further comprising the step of outputting the data sets registered in said queue when the further repetition of said steps (b) to (d) is stopped.

4. The method according to claim 1, wherein said predetermined order is arbitrarily determined.

5. The method according to claim 1, wherein said predetermined order is determined based upon the number of data transmissions executed in each program.

6. The method according to claim 1, wherein said predetermined order is determined by generating random numbers based on an execution time of each program.

7. The method according to claim 1, further comprising the step of linking a debug routine with the user program without compiling the user program again, said steps (a) to (e) being based on the debug routine.

8. The method according to claim 1, wherein each program includes a statement for outputting a variable array and a referred or defined area of the variable array for each access to the variable array, said method further comprising executing steps (a) to (e) in different order.

9. In a parallel computer system including a main processor and a plurality of processors each having an identifier, a method for debugging a plurality of parallel programs of a user program, each parallel program including code for outputting a variable array, an accessed part thereof and definition or reference of the part by sequentially executing the parallel programs for identification of bugs, said method being executed by the computer system and comprising the steps of:
   (a) allocating the parallel programs to said processors, respectively;
   (b) registering the identifiers of said plurality of processors in a table in accordance with a predetermined rule;
   (c) controlling said processors to execute the allocated parallel programs in an order of numbers such that only one processor is active at a time, until each processor is brought into one of an end state and a waiting state for either data or synchronization, while outputting trace data;

(d) registering the identifier of the processor brought into the waiting state in the table;

(e) repeating said steps (c) and (d) until an end condition is satisfied; and (f) repeating said steps (b) to (e), wherein said step (b) is executed such that serial numbers are assigned to the processors in a different order.

10. The method according to claim 9, wherein the end condition is that the registered identifiers are the same as those before the repeating of said step (e).

11. The method according to claim 9, wherein said step (e) further comprises the step of outputting the identifiers of the processors in the waiting state when the end condition is satisfied.

12. In a multiprocessor system including a plurality of processors each having an identifier, a method for debugging a plurality of parallel programs of a user program by sequentially executing the parallel programs to identify a bug, said method being executed by the multiprocessor system and comprising the steps of:

(a) allocating the parallel programs to said processors, respectively;

(b) registering data sets for said processors in a execution waiting table in a predetermined order, each data set including an identifier of one of the processors and an address to be run therefrom of a corresponding parallel program allocated to said one processor;

(c) referring to one of the data sets registered in the execution waiting table in accordance with the predetermined order to control one of the processors for the referred data set to execute the parallel program allocated to said one processor from said address within the referred data set while updating said address until the processor is brought into either an end state or a waiting state for either data or synchronization; and (d) registering a data set for the processor in the execution waiting table when the processor has been brought into the waiting state, to repeat said step (c) until a predetermined end condition is satisfied.

13. The method according to claim 12, further comprising (e) repeating said steps (b) to (d) when the end condition is satisfied, wherein said step (b) is executed in a different order.

14. The method according to claim 13, wherein said step (d) includes the step of determining that the end condition is satisfied when no change is made in a content of the execution waiting table before and after the plurality of parallel programs are executed.

15. The method according to claim 13, wherein each parallel program include code outputting a name of a variable array, an accessed part thereof and definition or reference of the part as trace data, the array being shared by some of the parallel programs, and said step (c) further comprising the step of outputting the traced data for each access to the array during the execution of the allocated parallel programs.

16. A parallel computer system comprising:

a plurality of processors, each processor being assigned with an identifier and executing parallel programs of a user program;

an execution waiting queue;

means for registering data sets for said plurality of processors into said execution waiting queue in a predetermined order, each data set including an identifier of one of the processors and an execution start address of one of the parallel programs to be executed by the one processor;

means for causing said processors in accordance with the registered data sets, to execute the user program such that only one processor executes the corresponding parallel program one at a time in the order until the processor is brought into one of an end state and a waiting state for either data or synchronization;

means for registering a data set for the processor brought into the waiting state in said queue again; and measn for stopping the control when a predetermined end condition is satisified, to detect bugs in the parallel programs.

* * * * *

UNITED STATES PATENT AND TRADEMARK OFFICE
CERTIFICATE OF CORRECTION

PATENT NO. : 5,361,352
DATED : November 1, 1994
INVENTOR(S) : Kyoko Iwasawa, et al.

It is certified that error appears in the above-indentified patent and that said Letters Patent is hereby corrected as shown below:

Claim 15, column 12, line 13, delete "include" and substitute therefor --includes--.

Claim 16, column 12, line 41, delete "measn" and substitute therefor --means--.

Signed and Sealed this

Seventh Day of February, 1995

*Attest:*

BRUCE LEHMAN

*Attesting Officer*   *Commissioner of Patents and Trademarks*